United States Patent [19]
Hinson

[11] Patent Number: 5,322,350
[45] Date of Patent: Jun. 21, 1994

[54] TRUCK FOR ALTERNATELY HANDLING COMMINUTED AND PALLETIZED CARGO

[75] Inventor: Teddy P. Hinson, Mechanicsville, Va.

[73] Assignee: Solite Corporation, Richmond, Va.

[21] Appl. No.: 839,507

[22] Filed: Feb. 21, 1992

[51] Int. Cl.$^5$ .................................................. B60P 1/32
[52] U.S. Cl. ........................... 298/1 R; 296/181; 296/184; 410/80; 410/118; 414/494
[58] Field of Search ............... 244/118.1, 118.2; 296/181, 184; 410/10, 11, 23, 35, 52, 80, 81, 117, 118; 298/1 R; 414/494, 500, 786

[56] References Cited

U.S. PATENT DOCUMENTS

| | | | |
|---|---|---|---|
| 2,514,752 | 7/1950 | Faulkner | 414/500 |
| 2,745,566 | 5/1956 | Bouffard . | |
| 2,789,715 | 4/1957 | Filipoff | 414/500 |
| 2,819,810 | 1/1958 | Dewitt | 414/499 |
| 2,820,560 | 1/1958 | Davis . | |
| 3,827,753 | 8/1974 | Pitts | 298/1 R X |
| 3,901,552 | 8/1975 | Stone | 298/24 |
| 4,009,792 | 3/1977 | Sano | 414/536 |
| 4,018,480 | 4/1977 | Stone | 298/27 |
| 4,051,968 | 10/1977 | Massey | 414/500 X |
| 4,203,697 | 5/1980 | Cayton | 414/345 |
| 4,221,427 | 9/1980 | Sentle, Jr. | 296/181 |
| 4,231,695 | 11/1980 | Weston, Sr. | 414/498 |
| 4,418,853 | 12/1983 | Shaffer | 296/371 |
| 4,557,400 | 12/1985 | Clarke | 222/105 |
| 4,824,050 | 4/1989 | Courter | 244/118.1 |
| 4,890,970 | 1/1990 | Willits | 414/462 |
| 4,984,756 | 1/1991 | Anders | 244/118.1 X |
| 5,022,809 | 6/1991 | Hinson | 414/494 |
| 5,085,382 | 2/1992 | Finkenbeiner | 244/118.1 |
| 5,154,480 | 10/1992 | Jones | 296/181 |

FOREIGN PATENT DOCUMENTS

| | | | |
|---|---|---|---|
| 63-82228 | 4/1988 | Japan | 414/500 |
| 7802946 | 2/1980 | Sweden | 296/181 |

OTHER PUBLICATIONS

Alumatech Catalog, 4 pages.

Primary Examiner—Michael S. Huppert
Assistant Examiner—Janice Krizek
Attorney, Agent, or Firm—Dowell & Dowell

[57] ABSTRACT

A dumping type vehicle having a body which is semi-circular in cross section and wherein the body is provided with a plurality of removable floor units each of which spans the body in spaced relationship to its upper and lower portions and each of which is moveable individually from a loading end forwardly of the body with cargo placed thereon by way of a mechanical loading system.

21 Claims, 3 Drawing Sheets

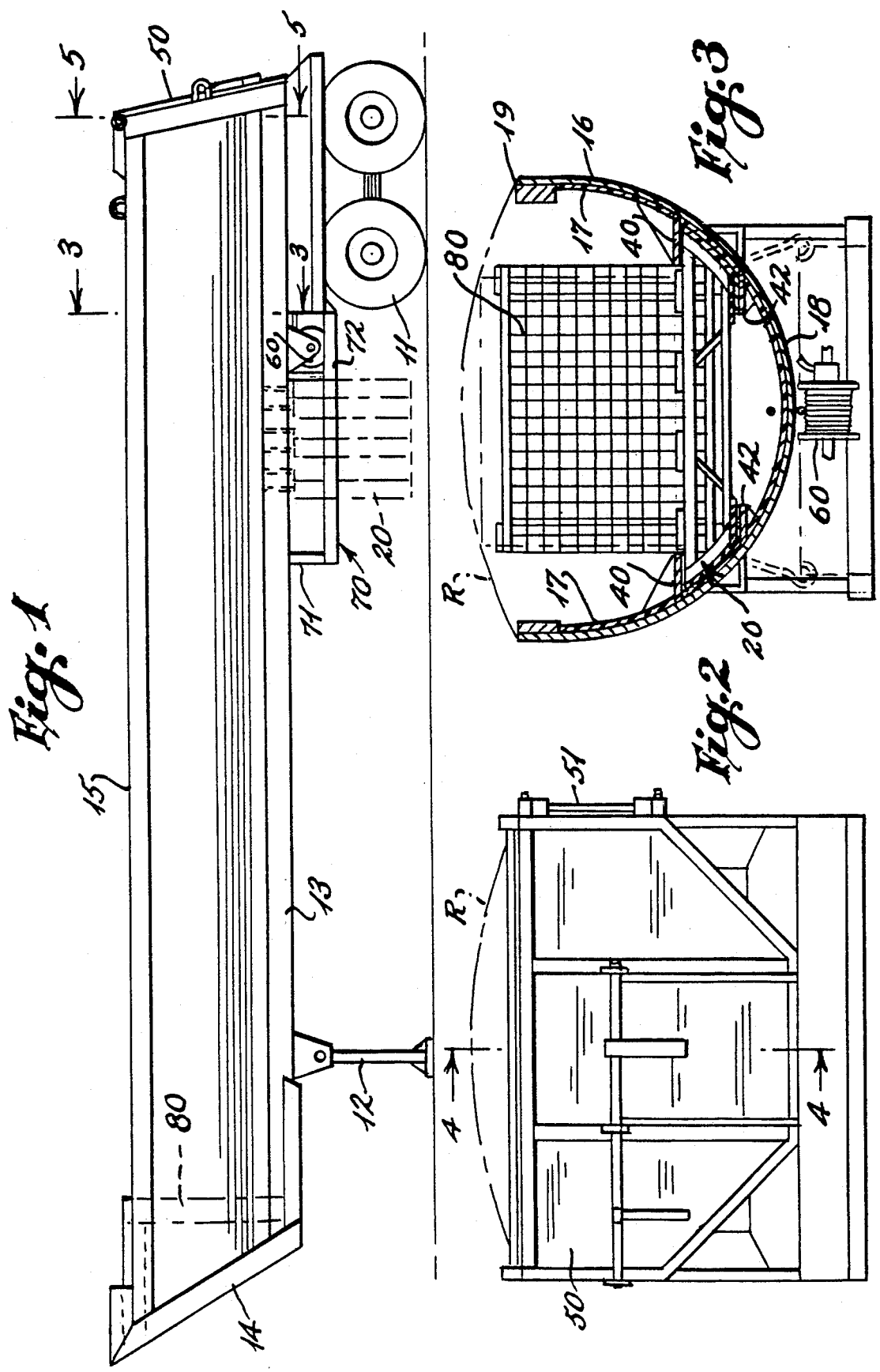

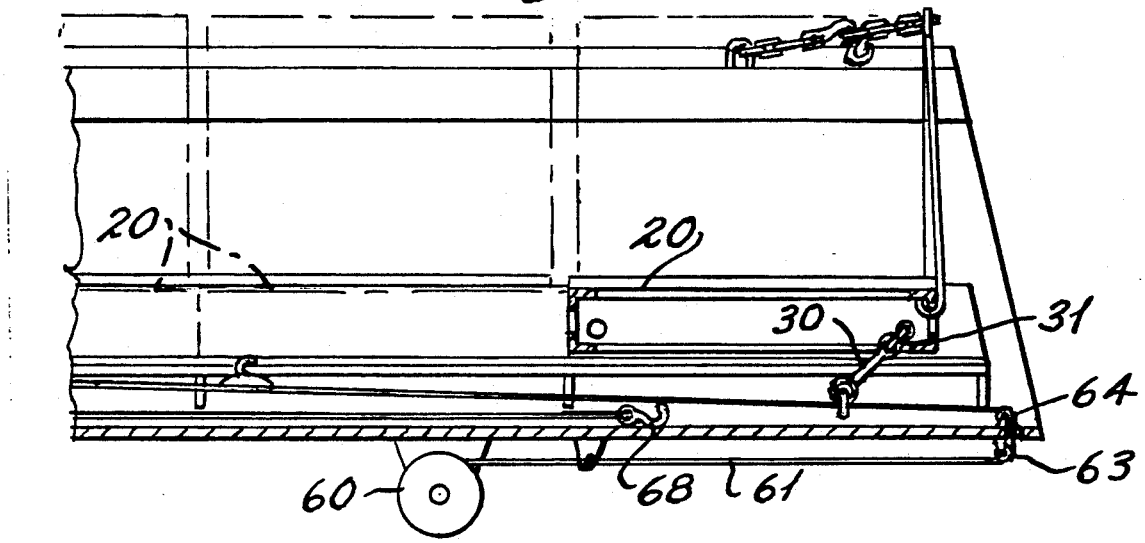
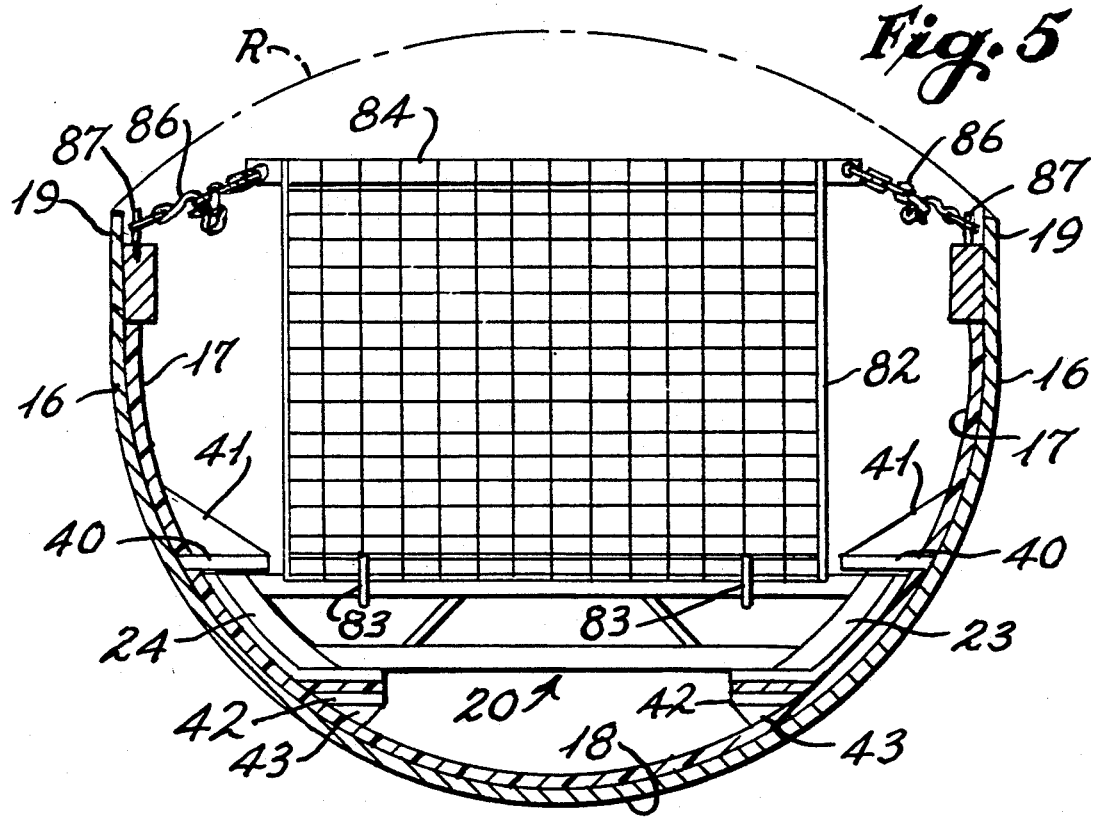
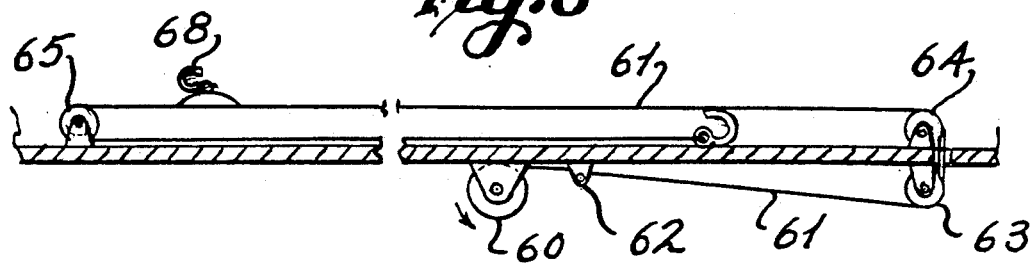

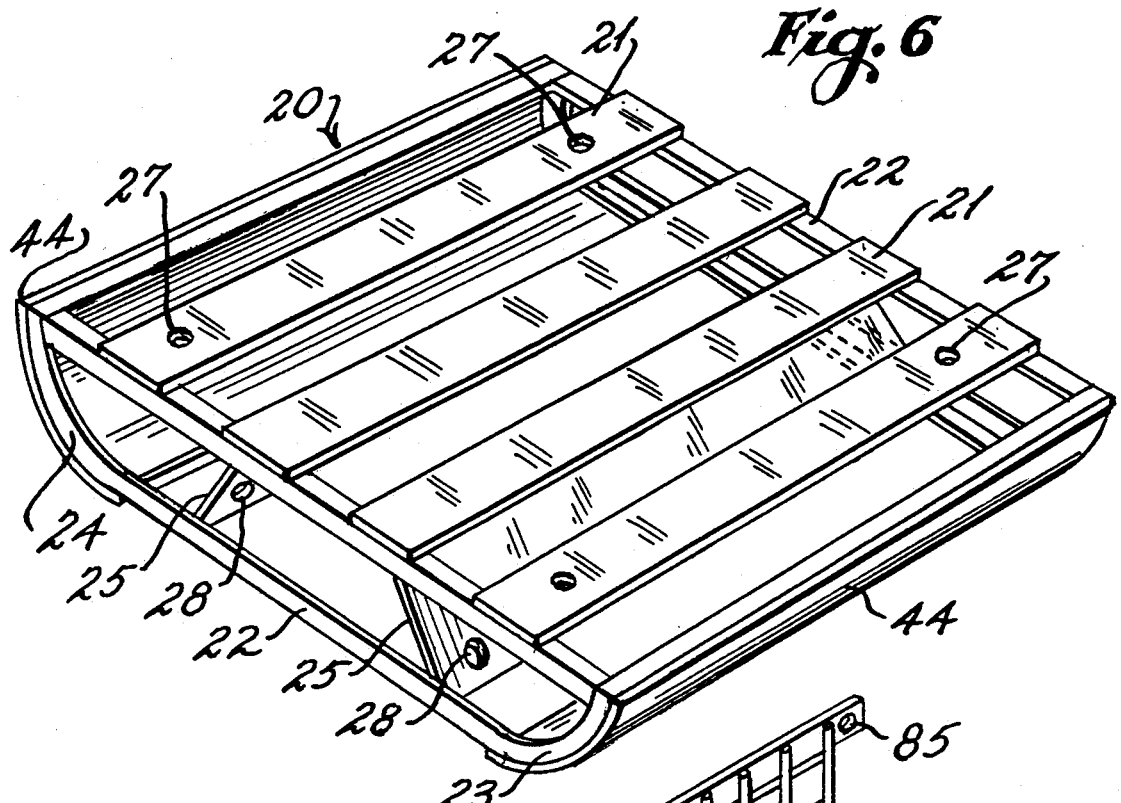
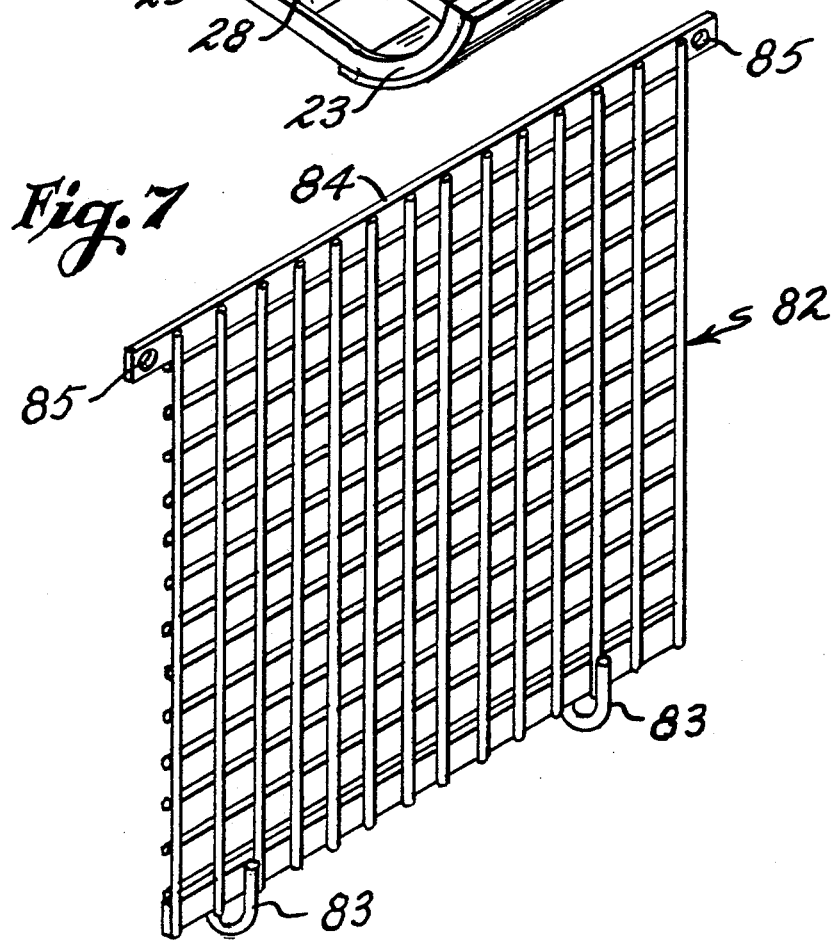

TRUCK FOR ALTERNATELY HANDLING COMMINUTED AND PALLETIZED CARGO

BACKGROUND OF THE INVENTION

1. Field of the Invention

This invention relates to truck or trailer bodies used for hauling cargo and more particularly to such bodies which are selectively adapted for hauling either comminuted or unitary or palletized cargo placed on pallets.

The invention particularly relates to vehicles of the general type described in my previous U.S. Pat. No. 5,022,809 which include a dumping body which is adapted to haul material such as construction type aggregate in one direction and, unitary cargo such as blocks made from such aggregate, in another direction.

2. History of the Related Art

As described in my earlier patent, a considerable savings can be realized if a vehicle used for hauling either aggregate or construction blocks, may be utilized for both purposes, thereby saving the down time of a vehicle returning empty. For a general overview of the prior art, reference is made to the references of record in that patent. Other patents of possible relevance include Bouffard U.S. Pat. No. 2,745,566 and Davis U.S. Pat. No. 2,820,560, each of which describes a cargo carrier which may be connected to a cable system and pulled up a ramp onto a vehicle, for the purpose of loading objects such as pallets and their loads or other equipment.

SUMMARY OF THE INVENTION

It is object of the invention to provide a dumping type vehicle body having a generally semicircular cross section adaptive for carrying and dumping comminuted material and which has a series of removable floor units which may be placed in the vehicle body and individually loaded and moved forwardly of the vehicle in order to permit the loading of additional floor units. A vehicle carried system for moving the loaded units lengthwise of the vehicle for loading and unloading is also provided.

These and other objects of the invention will become apparent from the accompanying description in conjunction with the accompanying drawings.

BRIEF DESCRIPTION OF THE DRAWINGS

FIG. 1 is a left side elevational view of a trailer modified in accordance with the teachings of the present invention.

FIG. 2 is an enlarged rear elevational view of the tail gate of the trailer shown in FIG. 1.

FIG. 3 is an enlarged cross-sectional view taken along line 3—3 of FIG. 1.

FIG. 4 is a cross-sectional view taken along line 4—4 of FIG. 2 showing the floor units of the present invention.

FIG. 5 is an enlarged cross-sectional view taken along line 5—5 of FIG. 1 showing a rear cargo retention screen.

FIG. 6 is an enlarged perspective view of one of the floor units of the present invention.

FIG. 7 is a perspective view of the rear cargo retention screen of the present invention.

FIG. 8 is a side illustrational view of a mechanized winch system for shifting the floor units of the present invention.

DESCRIPTION OF THE PREFERRED EMBODIMENT

With further reference to the drawings, a trailer 10 is shown of the type that is hauled by a cab or tractor, not shown, and having rear wheels 11, at rest dolly supports 12, an undercarriage 13, and a front headboard 14. As indicated in FIG. 3, the body 15 of the trailer is substantially semicircular having a bed defined by arcuate side walls 16 and preferably has a liner of plastic or friction reducing material 17, or the like, installed therein and extending from the lowermost portion 18 of the bed upwardly toward the uppermost portions 19 thereof. A cover or roof R may be provided for the trailer.

As indicated in FIGS. 3, 5 and 6, a removable floor unit 20 is shown having an upper surface 21, end frames 22, arcuate side walls 23 and 24, and internal gussets or reinforcements 25. The upper surfaces, which may be either continuous or formed of spaced panels, are provided with spaced openings 27 and the lower reinforcements with spaced openings 28 for the purpose of attaching supports such as chains to secure the units in place within the trailer and/or to secure loads thereto.

The side walls 23 and 24 of the floor units are curved to substantially conform to the curvature of the side walls 16 of the trailer. The length of each floor unit between the side walls 23 and 24 is such as to span a portion of the trailer body spaced intermediate the uppermost portion 19 and lowermost portion 18 of the side walls. Such floor units may be positioned at any desired elevation above the lowermost portion of the trailer body, and may, in some instances, be supported on such lowermost portion, if desired.

With the floor units spanning the body, as shown in FIGS. 3 and 4, a plurality of anchors or chains 30 having hooks 31 at their outer ends and secured to the truck body may be employed to engage the flooring units within the openings 27 and 28 in order to secure the units when the trailer is being moved.

In order to stabilize the floor units against floating due to an unevenly balanced load, horizontal linear guides 40 are provided at each side of the trailer body and running the full length of the trailer. Although, in some instances, the guides 40 may be terminated in spaced relationship to the rear of the trailer, as shown in FIG. 4, so that the floor units 20 may be vertically positioned by forklift or the like into the trailer bed and thereafter moved or secured as discussed hereinbelow. While upper guides 40 may be adequate in a given situation, in some instances, lower guides 42 may also be employed. In order to reduce the frictional engagement between the floor units 20 and the truck body liner 17, plastic or other friction reducing strips 44 may be provided at each end of the flooring unit. Such strips will permit the floor units to slide relatively easily with respect to the liner 17 of the trailer bed.

The liner guides 40 and 42 are preferably formed of aluminum and are welded to the interior of the trailer bed. These may be strengthened by gussets 41 and 43 situated along the trailer body at spaced intervals on the upper side of the guides 40 and the lower side of the guides 42.

The rear of the trailer is provided with a door 50 carried by hinges 51. The door swings open to permit unloading of an aggregate cargo and loading and unloading of the palleted type cargo.

As shown in FIGS. 4 and 8, in order to facilitate the moving of palleted type cargo into and out of the trailer, a cable winch system is employed including a hydraulic winch 60 which draws a cable 61 over a series of rollers or pulleys 62, 63, 64 and 65. At the end of the cable a hook 68 is attached. As referenced in FIG. 1, to facilitate the transport of the movable floor units when they are not in use for hauling cargo, a rack 70 is mounted on the undercarriage 13 of the trailer and forwardly of the rear wheels. The rack includes depending support members 71 and cross members 72.

In order to stabilize cargo carried by the rearmost floor unit, a rear support screen 82 is provided, as shown in FIGS. 4, 5 and 7. The rear support screen is of an enlarged mesh configuration having a pair of lower hooks 83 extending therefrom for engaging into the openings 27 of the last floor unit being placed within the trailer. In addition, the uppermost portion of the screen includes a support bar 84 having openings 85 in the sides thereof to which anchoring chains 86 may be secured to anchors 87 mounted adjacent the rear portion of the trailer bed and adjacent the uppermost portion of the side walls, as is shown in FIG. 5. The rear screen is utilized to securely anchor each of the floor units in relationship with respect to one another during hauling of the palletized cargo. The rear screen 82 may be removed and carried by the support rack 70 when not in use.

In some instances, it may only be necessary to provide anti-frictional coatings or layers to one or both of the side walls of the floor units and the portion of the trailer side walls intermediate the guides 40 and 42 with such coatings also being provided on the upper surface of the guides 42 as shown in FIG. 5.

In the use of the device, assuming that comminuted material is to be hauled initially, the body of the trailer is loaded, the rear door 50 being closed, and the removable flooring units being outside of the truck body such as being mounted on the racks as indicated in FIG. 1. The truck is then driven to the destination for the delivery of bulk material where the swinging door 50 is opened and the body raised into a dumping position in order to discharge the comminuted cargo. The truck body is then returned to horizontal and moved to a location for loading of the palletized cargo. In such position, the swinging door 50 is opened and a first floor unit is placed in the rear of the trailer body. Since the floor units are made out of aluminum their weight is approximately 10–12 lbs., thereby facilitating the handling thereof. An average unit may be approximately 40"×48" in size. After a floor unit is placed in a trailer, it may then be loaded by means of a forklift truck or other device with units of cargo such as block or with pallets on which the cargo rests. If preferred, the floor units may be loaded on the ground as if functioning as pallets and then the load units lifted onto the trailer. After the first floor unit is positioned and loaded, the cable system is employed to draw it as far forwardly as possible in the trailer until it contacts the front screen 80. A second floor unit is then positioned and loaded and moved forwardly in similar manner, and this is continued until the truck is completely loaded. The upper and lower guides 40 and 42 will stabilize the floor units as they are moved into position. The anchor chains 30 are then secured to the rear most floor unit and the rear screen 82 secured to the floor unit with hook 83 and to the sides of the bed by the chains 86.

In order to stabilize cargo mounted on the forward most floor unit, a forwardly placed stabilization screen 80 is mounted adjacent the headboard 14 of the trailer and which is secured to the headboard to ensure that it is vertically oriented. The screen is of a mesh size of generally an inch or more to permit aggregate to freely pass therethrough when the trailer is utilized to haul aggregate. The front stabilization screen will prevent any cargo from shifting forwardly toward the headboard 14 during transport of palletized cargo.

After the palleted cargo is transported to its destination, the floor units 20 are unloaded from the body of the truck by using the hook and cable system. Thereafter, the truck is ready to be reloaded with comminuted cargo material. Due to the close engagement of the end walls of the floor units with the interior walls of the trailer, the likelihood of the load shifting during transport is reduced.

A dumping trailer having a semicircular body may be readily converted to a pallet type cargo hauling trailer in accordance with the present invention by providing a swinging hinge door at the rear, applying a protective and anti-friction lining such as a plastic lining of the present invention within the body, providing removable floor units of the general type described, and preferably providing a winch and cable system of the type described. In addition, racks for carrying flooring units during hauling of comminuted material are preferably provided as indicated.

I claim:

1. A dumping vehicle comprising, a body that is moveable from a horizontal to an inclined position for loading and transporting comminuted material while in a horizontal position and dumping it while in the inclined position, or, alternatively, for loading, transporting, and unloading non-comminuted cargo while in the horizontal position, said vehicle body having a bed portion which is generally semicircular in cross section including side walls having upper and lower portions for holding comminuted material in the bed portion, said bed portion having a wall that may be opened to permit the dumping of comminuted material when said bed portion is in an inclined position, or, alternatively, to permit the loading and unloading of non-comminuted cargo when said bed portion is in a horizontal position, a plurality of floor units, each unit being of a length to span said bed portion intermediate the upper and lower portions of said side walls thereof and having side portions for engaging against said side walls of said bed portion, and means mounted on the vehicle and having floor unit engaging means for moving said floor units along said bed portion while the vehicle body is in a horizontal position.

2. The vehicle of claim 1, in which said vehicle body is supported on an undercarriage frame, said vehicle including rack means mounted to said frame for carrying said floor units beneath the vehicle body.

3. The vehicle of claim 2, in which said rack means includes support members depending from said frame and cross members carried by said support members.

4. The vehicle of claim 1, in which said bed portion of said body has anti-friction means extending along said side walls thereof.

5. The vehicle of claim 4, in which the anti-friction means is a plastic liner.

6. The vehicle of claim 4, in which each of said floor units has friction reducing means for engaging said anti-friction means.

7. The vehicle of claim 1, in which each of the floor units has friction reducing means for engaging said side walls of said bed portion.

8. The vehicle of claim 7, in which said friction reducing means is a plastic coating provided at least along said side portions of said floor units.

9. The vehicle of claim 8, in which said side portions of said floor units are complementary in configuration to said side walls of said bed portion.

10. The vehicle of claim 1 having guide means mounted to said side walls of said bed portion for engaging said floor units in order to restrain the floor units from movement during transport.

11. The vehicle of claim 10, in which said guide means includes at least one first pair of generally longitudinally extending guides, each guide of the first pair mounted in opposing relationship to one another on said side walls of said bed portion intermediate said lower side walls and said upper portions thereof, said floor units being slidably receivable beneath said guides.

12. The vehicle of claim 11 including a second pair of lower guides, each guide of the second pair being mounted in opposing relationship to one another on said side walls of said bed portion and intermediate said first pair of guides and said lower portion of said side walls, said floor units being receivable between said first and second pairs of guides.

13. The vehicle of claim 12 including friction reducing means provided along said side walls between said first and second pairs of guides.

14. The vehicle of claim 13 including anti-friction means carried by said floor units and along said side portions thereof.

15. The vehicle of claim 14 including anti-friction means disposed along an upper surface portion of each of said second pair of guides.

16. The vehicle of claim 1 in which said bed portion includes a forward end, a first screen means mounted adjacent said forward end and within said bed portion, and means for anchoring said first screen means within said bed portion.

17. The vehicle of claim 16 including a second screen means and means for mounting said second screen means adjacent said wall that may be opened.

18. The vehicle of claim 17, in which said means for mounting said second screen means includes means for interengaging at least one of said floor units with said second screen means within said bed portion.

19. A two way hauling system comprising a dumping vehicle for hauling comminuted material, said vehicle having a body including a bed portion which is generally semicircular in cross section, said bed portion having front and rear ends, an end wall and opposing side walls, said end wall being mounted for opening and closing, said bed portion being moveable from a horizontal to an inclined position for loading and transporting comminuted material while in the horizontal position and dumping it while in the inclined position, or, alternatively, for loading, transporting, and unloading non-comminuted cargo while in the horizontal position, floor unit means mounted on said bed portion for receiving cargo units which are selectively mountable on said floor unit means whereby comminuted cargo may be hauled in one transport direction of said vehicle and cargo units in an opposite transport direction of said vehicle, a winch for moving said floor unit means along said bed portion of said vehicle, said winch being mounted beneath said bed portion of said vehicle, and spaced pulley means mounted at said front and said rear ends of said bed portion of said vehicle, a cable extending from said winch and having a first run extending from said winch and about said pulley means mounted at said rear end of said bed portion, an intermediate run extending between said spaced pulley means, and an end run extending from said pulley means mounted at said front end of said bed portion toward said rear end thereof, said end run of said cable having a free end, a first floor unit engaging means provided at said free end of said cable and a second floor unit engaging means mounted on said intermediate run of said cable.

20. The two way hauling system of claim 19 in which said bed portion has anti-friction means extending along said side walls thereof.

21. The two way hauling system of claim 20 in which each of said floor units has friction reducing means for engaging said anti-friction means.

* * * * *